United States Patent [19]

Price

[11] Patent Number: 4,551,047

[45] Date of Patent: Nov. 5, 1985

[54] ROUTER DEVICE

[76] Inventor: Dalby L. Price, 2650 SW. Mitchell, Portland, Oreg. 97201

[21] Appl. No.: 567,392

[22] Filed: Dec. 30, 1983

Related U.S. Application Data

[63] Continuation-in-part of Ser. No. 302,174, Sep. 14, 1981, abandoned.

[51] Int. Cl.[4] .............................................. B23C 1/20
[52] U.S. Cl. ................................ 409/182; 144/134 D
[58] Field of Search ............... 409/181, 182, 175, 180; 144/134 D, 156, 118, 119 R; 299/34, 32, 39, 41

[56] References Cited

U.S. PATENT DOCUMENTS

| | | | |
|---|---|---|---|
| 1,581,720 | 4/1926 | Carter | 409/182 |
| 2,721,502 | 10/1955 | Adams | 409/182 |
| 3,170,373 | 2/1965 | Crepeau et al. | 409/182 |
| 3,454,061 | 7/1969 | Cordone et al. | 409/182 X |
| 3,499,365 | 3/1970 | Needham | 409/182 X |
| 3,955,607 | 5/1976 | Roche | 409/182 X |
| 4,290,464 | 9/1981 | Marsan | 409/182 X |
| 4,406,568 | 9/1983 | Rogers et al. | 409/182 |

Primary Examiner—William R. Briggs
Attorney, Agent, or Firm—Kolisch, Hartwell & Dickinson

[57] ABSTRACT

A router device having a cutting blade which rotates in a planar path normal to the axis of blade rotation. The path intersects a work surface at an angle. This angle and the position of the path along the axis of blade rotation, are both adjustable cooperatively to vary the length and depth of cut the blade makes in the work surface.

1 Claim, 8 Drawing Figures

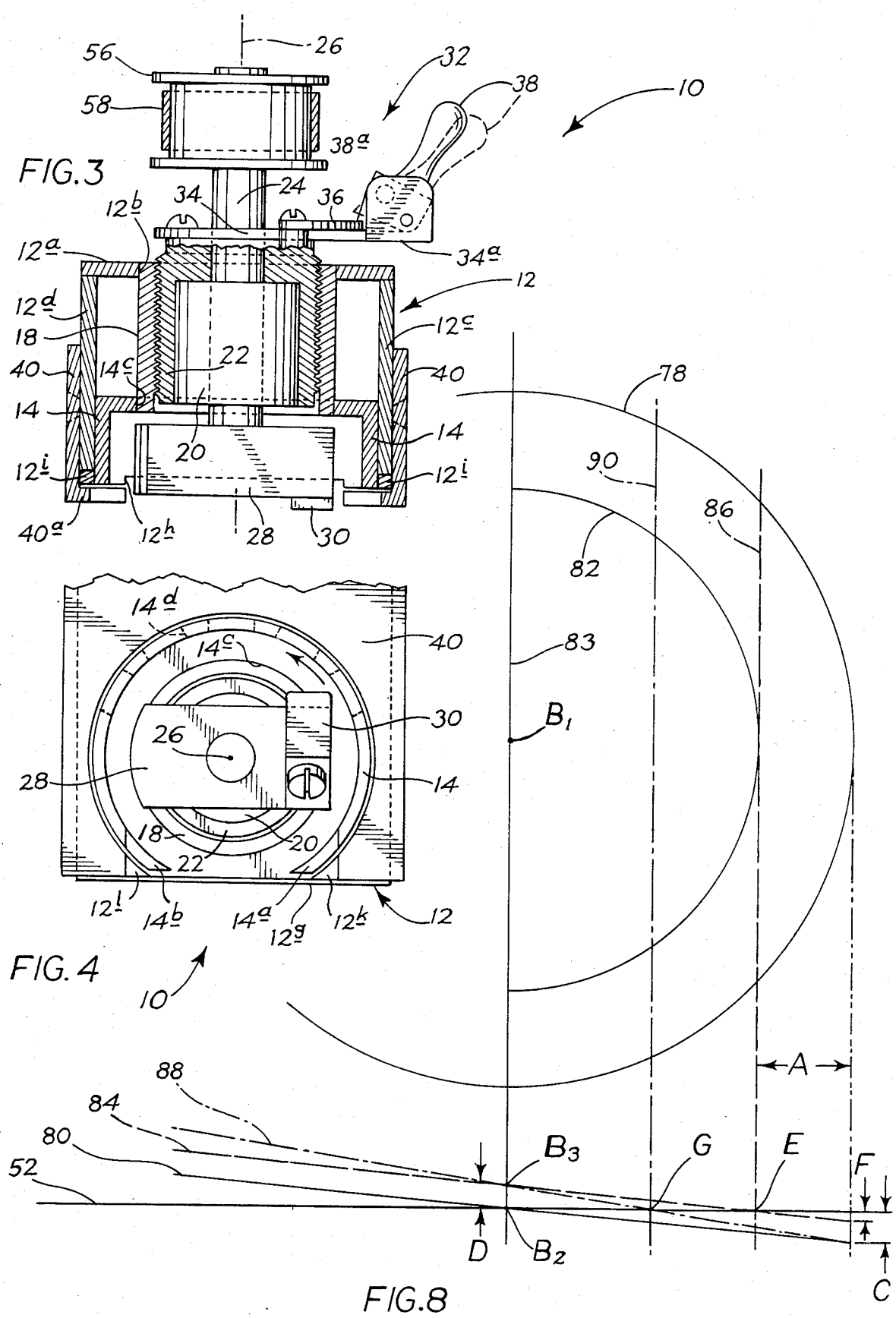

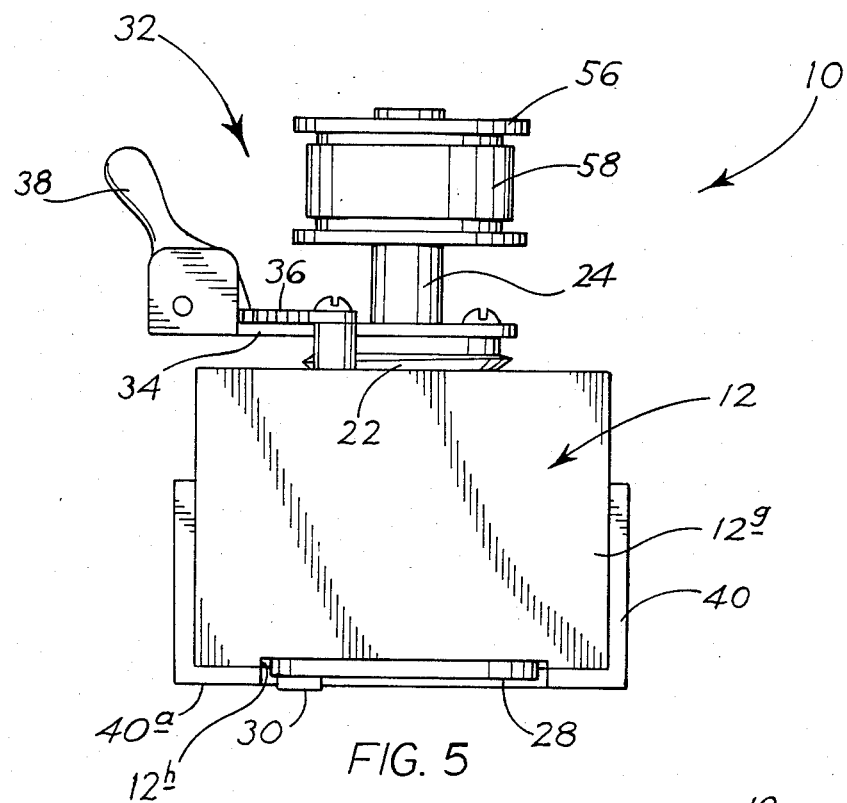
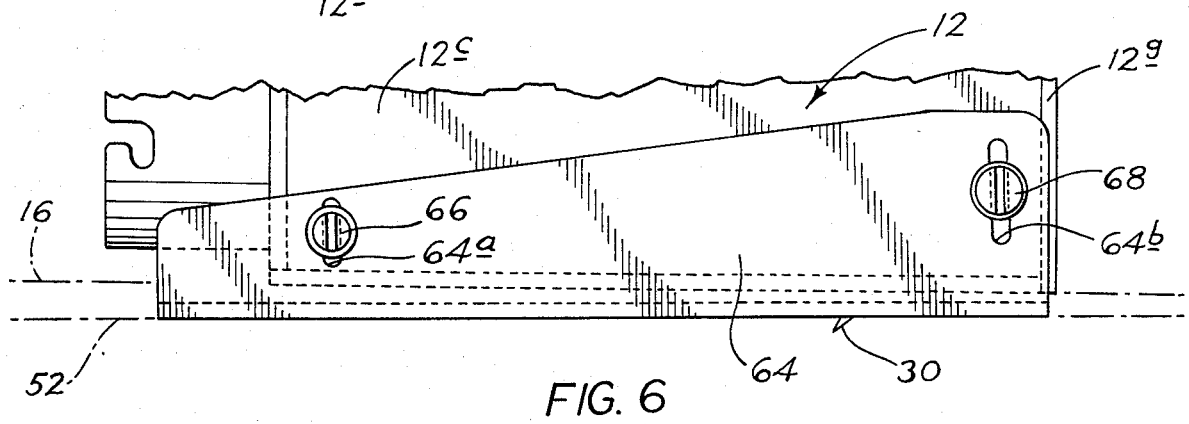
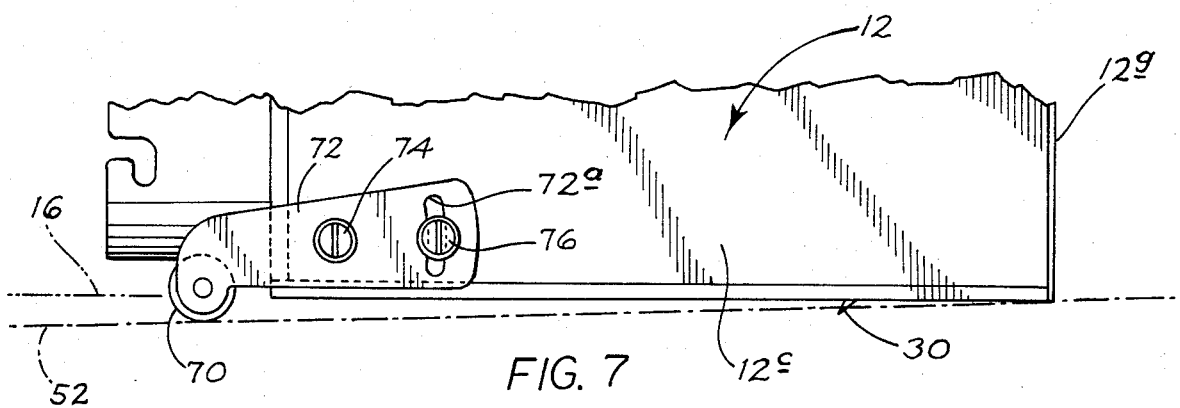

4,551,047

ROUTER DEVICE

CROSS-REFERENCE TO RELATED APPLICATION

This application is a continuation-in-part of my prior-filed application Ser. No. 302,174, filed Sept. 14, 1981 entitled PAINT ROUTER DEVICE, now abandoned.

BACKGROUND AND SUMMARY OF THE INVENTION

This invention pertains to a router device, and in particular, to such a device which has a rotatable cutter rotatable about an axes to move in a planar path of rotation which path is adjustable along the axis of rotation and also angularly relative to a path-intersected work surface.

Various devices have been developed for routing a surface. One use of such a device is to remove paint from a surface so that it may be repainted. A common type of router has cutting blades which rotate about an axis of rotation in a plane normal thereto. An example of such a device is disclosed in the patent to Raynor, U.S. Pat. No. 1,574,740, which has a cutting path essentially parallel to a work surface. The path is axially adjustable to vary the depth of cut in the surface. A related device, such as is disclosed in the patent to Sakamoto, U.S. Pat. No. 4,059,568, provides for partial exposure of as rotary blade to provide cutting during only a portion of the blade's travel. The blade therein disclosed is rotatably mounted in a fixed position so that the plane of blade travel is fixed relative to the device.

Varying surface types and conditions, as well as purposes for routing, make it desirable to produce a cut which is variable as to width and depth to accommodate the particular situation. For example, if there is excess paint buildup over an area of a work surface, it can best be removed by using a cut which is essentially the same width as the paint buildup and the same depth. Such a router would be able to remove the excess paint without removing the underlying or adjacent paint.

It is, therefore, a general object of the present invention to provide a router device which will accommodate varying both the width and depth of cut.

It is a specific object of the present invention to provide a router device in which the cutting blade rotates about an axis in a nearly horizontal plane, which is adjustable axially along said axis, and angularly, to vary the depth and width of the cut.

In one embodiment of the present invention, a rotatably mounted cutting blade is disposed in a frame with the path of the blade when rotating being in a plane which is at a slight angle and intersects the plane of a work surface. The rotatable cutting blade is adjustable along its axis of rotation by mounting it on the frame in a threaded cylindrical bushing. A plate, adjustably pivotably attached to the frame, defines a workpiece contact plane, and manipulation of this plate adjusts the angle of the plane of the cutting path relative to the work surface plane.

These and additional objects and advantages of the present invention will be more clearly understood from a consideration of the drawings and the following detailed description of preferred embodiments.

BRIEF DESCRIPTION OF THE DRAWINGS

FIG. 3 is a cross-sectional view taken along line 3—3 in FIG. 2.

FIG. 4 is a fragmentary bottom view turned clockwise 90° from a view taken along line 4—4 in FIG. 2.

FIG. 5 is an end view taken along line 5—5 in FIG. 2, with certain background structure omitted for the sake of clarity.

FIG. 6 is a fragmentary side view, analogous to FIG. 2, of a second preferred embodiment of the invention.

FIG. 7 is a fragmentary side view, also analogous to FIG. 2, of a third preferred embodiment of the invention.

FIG. 8 is a sketch showing the relationship between lengths and depths of cuts based on relative axial and angular positions of the cutting paths (producible by the embodiments of the invention) with a workpiece contact plane.

DETAILED DESCRIPTION OF THE INVENTION

Figure 1:
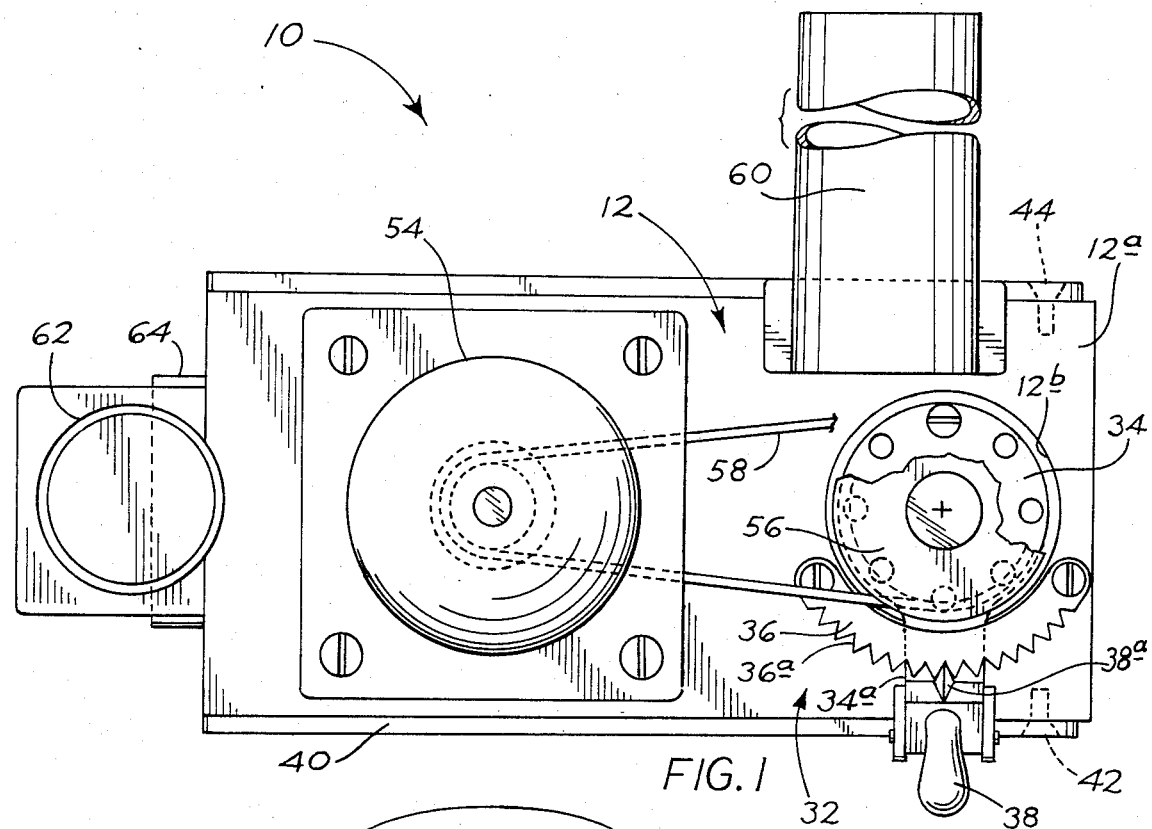
FIG. 1 is a fragmentary top plan view of a first preferred embodiment made in accordance with this invention.
Figure 2:
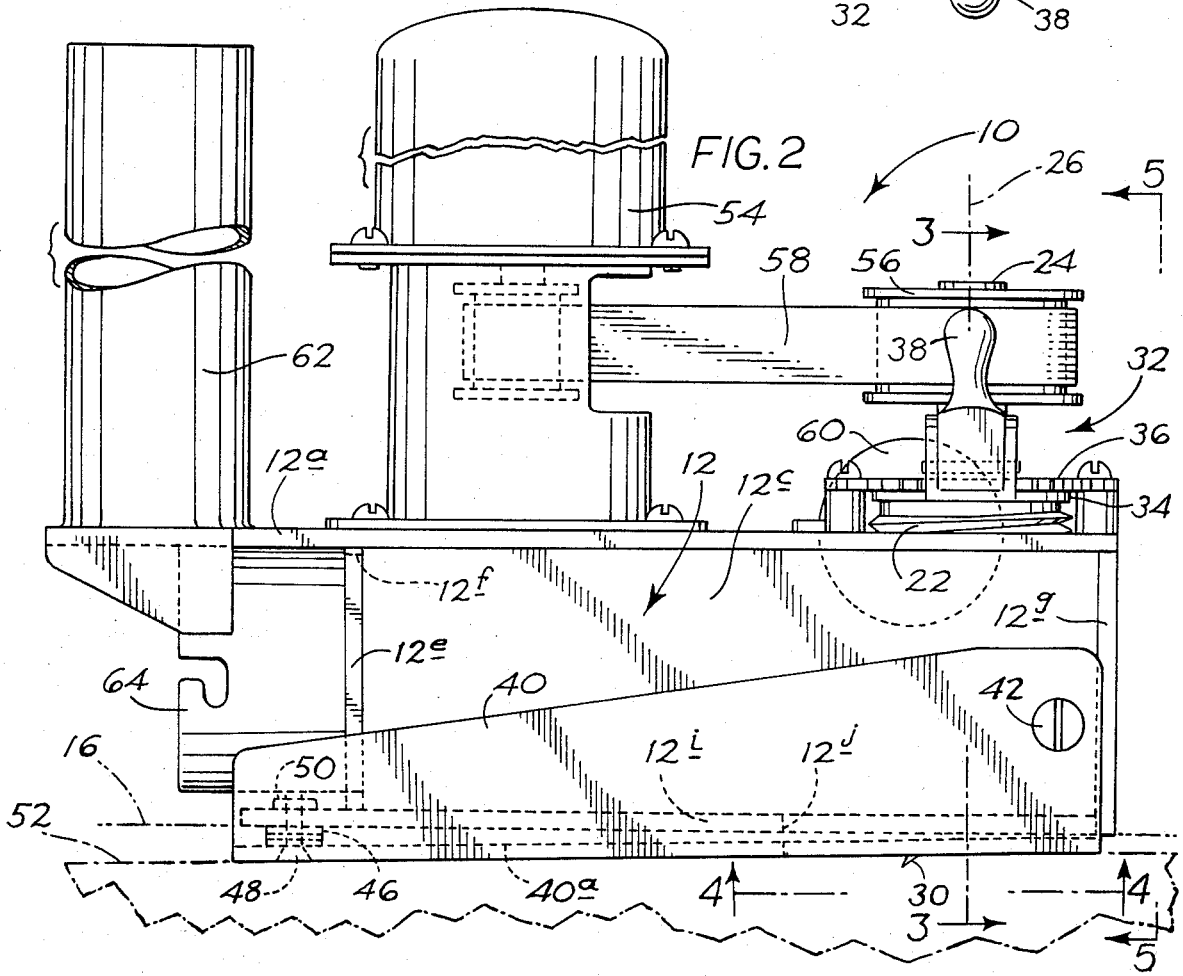
FIG. 2 is a fragmentary side view viewing the bottom side of the device illustrated in FIG. 1.

Referring initially to FIGS. 1 through 5, and describing the structure of a first preferred embodiment, a surface-router device, as contemplated by this invention, is shown generally at 10. Device 10 includes a box-like frame 12 forming the outer part of a housing, having parallel to the plane of view of FIG. 1, a generally rectangular top plate 12a which has a circular opening 12b in its right or forward end. The purpose for the opening will be explained subsequently. Two parallel side plates 12c, 12d are attached to the right and left margins of top 12a, as shown in FIG. 3. A rear plate 12e (see FIG. 2), joined to the rear margins of the top and sides, also has a generally circular opening 12f. On the opposite end of frame 12 from rear 12e is a front plate 12g, shown in FIGS. 2 and 5. The lower margin of front plate 12g has an elongate, centrally disposed indentation 12h. Forming the bottom of frame 12 is a bottom plate 12i (see FIG. 2) which is essentially parallel with top plate 12a. In the forward or right hand side of bottom plate 12i is a circular opening 12j which is axially aligned with opening 12b in top plate 12a. The purpose of opening 12j will be explained subsequently. The rear end of bottom plate 12i extends rearwardly from its line of contact with rear plate 12e.

Disposed within frame 12 is a generally cylindrical inverted can 14 (see FIG. 3) which has an outer diameter equal to the diameter of bottom opening 12j. The lower edge of can 14 and the bottom surface of bottom plate 12i are disposed in a common plane, shown as a dash-dot-dot line 16 in FIG. 2. The forward side of can 14 is truncated by front 12g, as shown in FIG. 4. The lower tips 14a, 14b of can 14 and associated tips 12k, 12l of bottom 12i are cut away and cooperate with adjacent indentation 12h in plate 12g to form a shallow channel into can 14, as shown in FIGS. 4, 5.

The top surface of can 14 has a circular opening 14c equal in diameter to opening 12b. Secured on the inside edges of both openings is a cylindrical, internally-threaded hollow sleeve 18.

Referring to FIG. 3, a bearing 20 is rigidly mounted in a cylindrical bearing housing 22. Housing 22 has external threads meshing with the threads in sleeve 18. A cutter shaft 24, freely rotatable in bearing 20, is fixed longitudinally to housing 22 by retaining rings not shown.

Shaft 24 may be moved along its longitudinal axis, shown by dash-dot line 26, by screwing housing 22 whereby such moves along the inside of sleeve 18. The lower end of shaft 24 extends into the interior of can 14 and is attached to the mid region of an elongate bar 28. Attached to a lower outer edge of bar 28 is a replaceable cutter, or blade, 30, also referred to herein as rotary cutter means. The cutting edge of cutter 30 extends below the lower surface of bar 28.

With rotation of shaft 24, bar 28 and cutter or blade 30 rotate within the compartment formed by can 14 and associated housing structure, which compartment extends about the sides and over the top of the region where the cutter is rotating. This compartment is open at the bottom to expose the moving cutter or blade. The cutter or blade moves in a plane which is normal to the axis of shaft 24.

The axial position of shaft 24 may be adjusted selectively using an adjustment assembly shown generally at 32. Included in assembly 32 is a crank 34 secured as by screws to housing 22. The crank includes crank arm 34a that extends under a radius bar 36 which is connected to top plate 12a. On the distal end of crank arm 34a is pivotally mounted a lever 38. On the inner edge of lever 38 is a knob 38a which is selectively positionable within notches, such as notch 36a, in bar 36. The knob may be removed from a notch by pulling lever 38 away from shaft 24, as shown by the phantom image of the lever in FIG. 3. The lever, notches, and knob constitute means for releasably locking housing 22 and the shaft which it supports in a given adjusted position.

Disposed along the bottom and partially up the sides of frame 12 (and thus exteriorly of the housing for the router device) is a channel 40. Channel 40 is pivotally attached near its forward margin to side plates 12c, 12d by axially aligned screws 42, 44, respectively. A base 40a in channel 40 has essentially the same shape as bottom plate 12i. Disposed between a rear extension of plate 12i and base 40a are shims, such as shim 46. Shims 46 are removably held in position by a countersunk screw 48 extending through bores provided in bottom plate 12i and base 40a, and nut 50.

Pivoted channel 40 constitutes an adjustable workpiece-engaging support structure in the router device. The lower flat surface of the channel defines the contact plane of the router device. With replacement of the size of the shims employed, or with the removal or addition of shims, the channel is adjustably positioned to change the position of the housing relative to the contact plane of the channel 40.

Completing a description of the first preferred embodiment, shaft 24 is drivingly connected to a motor 54 mounted on the rear portion of top 12a by means of a pulley 56 fixedly attached to the upper end of the shaft and a belt 58, as shown. A forwardly positioned, horizontal, laterally extending handle 60, and a rearwardly positioned, vertical, laterally extending handle 62 are attached to frame 12 as shown. Additionally, a tube portion 64, adapted to be attached to a vacuum hose, and having a diameter essentially the same as rear opening 12f, is attached to rear plate 12e.

With the motor and power transmitting means which connects the motor to the cutter shaft being located above the housing of the device, such are effectively shielded by the housing from the compartment which surrounds the cutter bar and cutter, and the loose debris that tends to be produced in the compartment with operation of the cutter.

Referring now to FIG. 6, and describing a second preferred embodiment of the invention, a channel similar in construction to channel 40 in the first embodiment is shown as a doubly swingingly adjustably attached channel 64. The side, vertical portions of channel 64 have horizontally spaced, generally vertically directed, slightly arcuate, elongate slits, such as rear slit 64a and forward slit 64b in the side of channel 64 associated with frame side 12a. Channel 64 is releasably fixed in position by screws, such as screws 66, 68, extending through slits 64a, 64b, respectively, into side plate 12c. In this embodiment, channel 64 replaces both channel 40 and the threaded axial adjusting mechanism of the first embodiment. Channel 64, including the associated structure providing for adjustment, is also referred to herein as adjustment means.

Referring to FIG. 7, and explaining the construction of a third embodiment, channel 40 of the first embodiment is replaced by a roller 70 having an axis of rotation normal to the plane of the drawing. The roller is rotatably attached to elongate brackets, such as bracket 72, shown in the figure. These brackets are pivotally mounted on the side plates in frame 12 by screws, such as by screw 74. Screws, such as screw 76, extend through generally vertical slits, such as slit 72a in bracket 72, for accommodating releasable anchoring of the brackets in different angular positions. Roller 80 is mounted on the brackets so that its lower surface extends below the plane of bottom 12i.

Referring now to FIG. 8, two orthogonally related sketches are shown which illustrate, for three positions of a cutting path of blade 30 relative to surface contact plate 52, the resulting thin generally C-shaped grooves routed from a planar work surface during blade rotation. The lower sketch shows the intersection of the three cutting path planes with work surface contact plane 52. The upper sketch shows, in an essentially plan view, the three grooves dug out by the blade for each of the cutting path positions shown in the lower sketch. In the upper sketch, point $B_1$ represents the point of intersection of the blade's axis of rotation with the cutting path plane. The outer solid line 78 in the upper sketch represents the outer edge or arc of travel of blade 30 during rotation about point $B_1$. The maximum groove width cut out by blade 30 during its travel is at most equal to the length of the blade edge which is shown as dimension A in the figure.

The first position of the cutting path is shown in the lower sketch as solid line 80 intersecting surface contact plane 52 at point $B_2$ which is also in alignment with the center of blade rotation. The depth of cut of blade 30 in this position is a maximum, as it is in all cases, at the right most point of travel in the sketches. This is shown as dimension C for this specific position of cutting path plane 80. The resulting groove routed by blade 30 is shown in the upper sketch by the reverse C-shaped area enclosed by solid lines 78, 82, which are concentric half circles, and portions of solid vertical line 83 which form the ends of the "C" shape.

The second cutting path plane position results from a purely axial movement away from plane 80 a distance D shown in the lower sketch. This new cutting plane, shown as dashed line 84 in the lower sketch, is parallel with plane 80. With the center of blade rotation at point $B_3$, plane 84 intersects surface plane 52 at point E. The resulting groove has a maximum depth of F, as shown in the lower sketch. The resulting groove routed with the cutting plane in this position is represented by the area bounded by solid line 78 and vertical-dashed line 86 which forms a cord with line 78.

The third position shown results from a purely angular adjustment of the cutting path clockwise about the center of rotation $B_3$. A new cutting path 88, identified by the dash-dot line in FIG. 8, intersects surface plane 52 at point G and has a maximum groove depth of C. The resulting groove shown in the upper sketch has a truncated C-shape when compared to the groove of the first cutting path position. The area encompassed by the groove is that portion of the area of the first position enclosed between solid lines 78, 82 but which is terminated at the ends of the "C" shape by vertical-dash-dot line 90.

It can be seen that either a purely axial or purely angular adjustment in the cutting path relative to the workpiece contact plane changes both the width and depth of cut. By combining the two types of adjustments, it is possible to maintain a specific depth of cut and vary the width or conversely, to maintain the width and vary the depth. Thus, an infinite variety of combinations is possible.

Explaining operation of the first preferred embodiment as shown in FIGS. 1 through 5, the cutting path is initially adjusted along its axis of rotation by rotating housing 22 within sleeve 18, with crank 34 disconnected from the housing. The crank is then attached to the housing. Small incremental axial adjustments may then be made by positioning knob 38a selectively in a notch 36a along radius bar 36. These adjustments change both the depth and width of cut.

The angle of the surface contact plane relative to cutting path-defined by base 40a relative to bottom plate 12i may be made varied by changing the thickness of shims 46. If blade 30 is adjusted so that it extends, during part of its path, below the plane of base 40a, then a cut will be made below the work surface contact plane as was described with reference to FIG. 8. This would commonly be used if a surface has a layer of material, such as paint, on it which it is desired to remove.

A localized buildup of material on top of a surface may be removed by raising blade 30 until it is tangent at its lowest point to the work surface contact plane. As was discussed previously, coordination of both axial and angular adjustments are required in order to achieve a desired width of cut. The channel in the forward bottom edge of the device which conforms with indentation 12h in front plate 12g allows base 40a to remain flush with the work surface so long as the material is not wider than the channel. It is possible, then, by this method, to remove material which extends above the work surface contact plane.

In the second embodiment, the threaded axial adjustment mechanism provided in the first adjustment is not needed. As shown in FIG. 6, channel 64 may be adjusted pivotally about either or both screws 66, 68. Pivoting about screw 66 is analogous to the similar adjustment provided in the first embodiment. Adjustment about screw 68 provides primarily adjustment of the depth of cut, although there is, to a minor degree, also adjustment of the angle of cut. In the same sense, pivoting abut screw 64 primarily varies the angle of the cut, but to a lesser degree, also varies the cut depth. So, by concurrent adjusting and pivoting, of channel 64 about screws 66, 68, any depth or width of cut within the limitation of the device as constructed may be achieved.

In the third embodiment, as depicted in FIG. 7, depth adjustment is identical to that described for the first embodiment. Angular adjustments however, are made by rotating the brackets about their pivot screws, such as bracket 72 about screw 74. When the desired angle is achieved, the set screws, such as screw 76, are tightened to hold the roller in place.

While the invention has been particularly shown and described with reference to the foregoing preferred embodiments, it will be understood by those skilled in the art that other changes in form and detail may be made therein without departing from the spirit and scope of the invention as defined in the following claims.

It is claimed and desired to secure by Letters Patent:

1. A router device for processing a workpiece comprising a portable housing adapted to be moved over the workpiece being processed having wall structure defining at the base thereof a compartment which opens to the base of the housing, workpiece-engaging support structure mounted on the outside of said housing defining the contact plane of the router device and first adjustable means enabling pivoting of the housing relative to said contact plane, a cutter shaft and means mounting said shaft with the axis thereof substantially upright relative to said contact plane but inclined from perpendicularity to said contact plane, said cutter shaft having a bottom end within said compartment and extending upwardly from said compartment to an upper end above said housing structure, a bearing mounted in said housing structure above said compartment rotatably supporting said shaft, second adjustable means for shifting said bearing and the shaft that it supports in a direction extending axially of the shaft, means disposed above said housing for producing shifting of said bearing and locking of said bearing in a given adjusted position;

a motor mount on the top of said housing and power transmitting means connecting said motor and said cutter shaft above said housing, a cutter mounted on the bottom end of said shaft and disposed within said compartment moving on rotation of the shaft in a cutting plane which is disposed normal to the axis of the shaft and obliquely intersecting said contact plane, axial shifting of said bearing and the shaft it supports serving to vary the location of the intersection of said cutting plane with said contact plane and adjustment of said first adjustable means serving to vary the angularity of the intersection of the cutter plane with said support plane.

* * * * *